United States Patent [19]

Leibundgut et al.

[11] 4,021,914
[45] May 10, 1977

[54] GUIDE HANDLE FOR POWER TOOLS

[75] Inventors: Gottfried Leibundgut, Solothurn; René Joerg, Luterbach, both of Switzerland

[73] Assignee: Scintilla A.G., Solothurn, Switzerland

[22] Filed: Apr. 12, 1976

[21] Appl. No.: 675,809

[30] Foreign Application Priority Data

Apr. 30, 1975 Switzerland .................. 139105/75

[52] U.S. Cl. ................................................ 30/392
[51] Int. Cl.² ........................................ B27B 19/09
[58] Field of Search ............ 30/241, 242, 374, 375, 30/376, 392, 393, 394

[56] References Cited

UNITED STATES PATENTS

| 3,494,390 | 2/1970 | Dudek | 30/394 |
| 3,665,983 | 5/1972 | Wagner | 30/394 |
| 3,729,822 | 5/1973 | Batson | 30/394 |

*Primary Examiner*—Al Lawrence Smith
*Assistant Examiner*—J. C. Peters
*Attorney, Agent, or Firm*—Michael J. Striker

[57] ABSTRACT

In a power tool, particularly a saber saw having a cutting blade, a combination comprises a handheld housing having an upper and a lower portion and an end portion formed with an elongated bore which extends downwardly from the upper portion towards the lower portion. A cutting element is mounted at a lower region of the end portion of the housing. A guide handle has a hand-held head portion mounted at the upper portion of the housing, and an elongated shaft portion received in and mounted for turning movement relative to the elongated bore in either circumferential direction thereof so that the housing can be turned with respect to the handle during cutting for positioning the cutting element in a plurality of different cutting positions. The handle is mounted and de-mounted on the housing with a snap-type action. A locking bolt prevents the handle from being undesirably withdrawn from the bore without authorization.

14 Claims, 5 Drawing Figures

GUIDE HANDLE FOR POWER TOOLS

BACKGROUND OF THE INVENTION

The present invention relates to power tools in general and, more particularly, to power cutting tools having cutting elements. The invention is especially useful in saber saws having reciprocating cutting blades.

It is known for one skilled in the art of saber or jig saws to hold the housing with one hand, either with or without the aid of an extension handle, and to place the other hand on a detachably-mounted guide handle. The guide handle is generally positioned on the upper portion of the housing above the cutting blade so that one can simultaneously guide the cutting blade and exert downward pressure on the housing so as to prevent the power tool from wandering away from the desired cutting position.

The guide handles which are known in the art are formed with a head portion constituted of synthetic plastic material and a metallic elongated shaft portion which, in the region of its free end, is provided with an outer thread. In other words, in order to mount the guide handle on the housing, the guide handle must be screwed into a corresponding internal thread which is formed in the housing of the power tool.

However, these known handles have not proven to be altogether satisfactory in use. First of all, the prior art guide handles have the drawback that a user cannot easily guide the cutting blade to follow a predetermined cutting path. Since the guide handles are screwed into the housing, if one wishes to follow a curvilinear cutting path, then one must repeatedly loosen the handle counterclockwise and then pivot the housing relative to the handle. This is particularly inconvenient if one has to cut out a complex geometrical pattern. A user frequently will not bother with repeatedly unthreading the screw from the housing, thus relying solely on the strength of his arm to follow the desired cutting path, thereby making the cutting operation rather inaccurate and uneven.

Secondly, the metallic shaft portion of the prior art guide handles has the drawback that it conducts heat towards the hand of a user. The amount of heat generated by the motor contained within the housing and by the reciprocating cutting blade can be of a considerable magnitude if a cutting takes a long amount of time and/or if the material to be cut is possessed of a high resistance to cutting.

Finally, the prior art guide handles have the further disadvantage that they are especially difficult to remove when the power tools is to be used in a cramped environment. Where spatial requirements are limited, it is very inconvenient for a user to repeatedly unscrew the guide handle from the housing.

SUMMARY OF THE INVENTION

Accordingly, it is the general object of the present invention to overcome the disadvantages of the prior art.

An additional object of the present invention is to eliminate the use of threaded connections between a handle and a power tool housing.

A further object of the present invention is to insulate a user from the effects of heat generated by the power tool.

Yet a further object of the present invention is to easily and quickly mount and de-mount a guide handle from a power tool housing with a single motion.

Another object of the present invention is to permit pivoting of the power tool housing relative to the handle so that the cutting element of the power tool can be positioned in a plurality of different cutting positions.

In keeping with these objects and with others which will become apparent hereinafter, one feature of the invention resides, briefly stated, in a power tool, particularly a cutting tool having a cutting element, which comprises the following combination: a hand-held housing having an upper and a lower portion and an end portion formed with an elongated bore which extends downwardly from said upper portion towards said lower portion; a cutting element mounted at a lower region of said end portion of said housing; and a guide handle having a hand-held head portion mounted at said upper portion, and an elongated shaft portion received in and mounted for turning movement relative to said bore in either circumferential direction thereof so that the housing can be turned with respect to the handle during cutting for positioning the cutting element in a plurality of different cutting positions.

The feature of pivoting the housing about the handle in either circumferential direction permits one to easily follow a predetermined cutting path without having to repeatedly loosen a threaded connection. By further providing that all portions of the handle are constituted of heat-insulating material, such as synthetic plastic material, the effects of heat are substantially eliminated. Also, in accordance with the invention, a flange constituted of heat-insulating material can be mounted intermediate the housing body and the handle in order to further reduce heat energy transfer.

In accordance with yet another feature of the invention, the elongated bore, in which the handle is received, is formed with a shoulder. A collar is provided at a lower region of the shaft portion of the handle and extends generally in direction radially outwardly of the shaft portion. When the guide handle is inserted into the bore, the collar will engage the shoulder with a snap-type action. The insertion of the handle is performed by a single axial movement, thus simplifying the mounting operation. Similarly, the de-mounting of the handle from the housing is performed by a single axial movement in the opposite direction. In order to simplify the de-mounting, it is preferable if either the collar and/or the shoulder has a tapered engaging surface.

Furthermore, the invention may further comprise a locking bolt which is inserted into a central passage of the handle. The bolt comprises a cylindrical part which is coaxially received in the passage, a flange part which overlies the lower region of the shaft portion, and an enlarged part intermediate the cylindrical part and the flange part. Biasing means is provided adjacent the flange part to urge the enlarged part in position radially inwardly of the collar. This feature prevents the lower region of the shaft portion from radially collapsing when the handle is fully inserted into the bore.

It is further advantageous if the cylindrical part is a hollow tubular sleeve and is mounted directly above the reciprocating cutting element so that the latter can enter within the confines of the tubular part without interference during cutting. In this manner, the total height of the power tool can be substantially reduced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
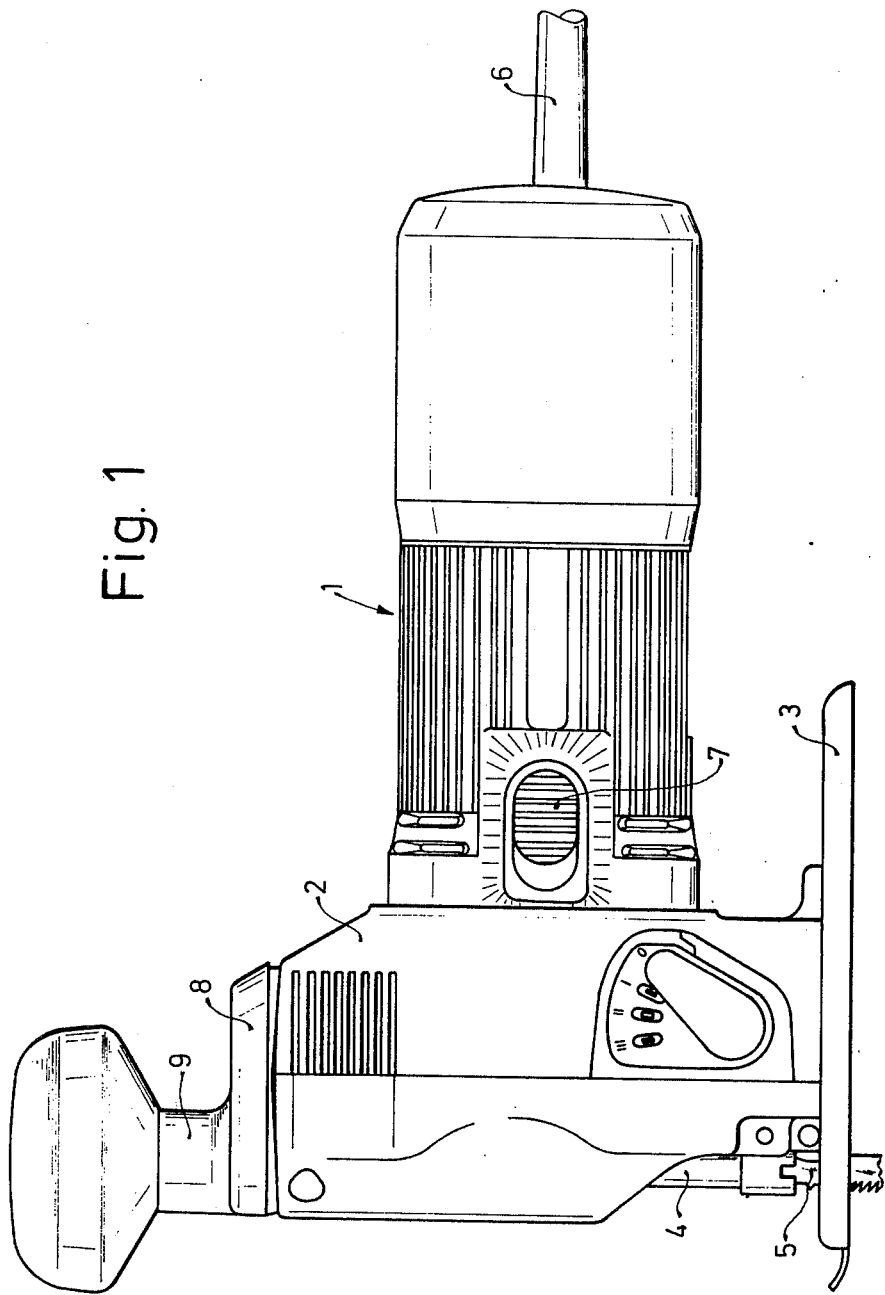
FIG. 1 is a side view of a power tool in accordance with the present invention.
Figure 2:
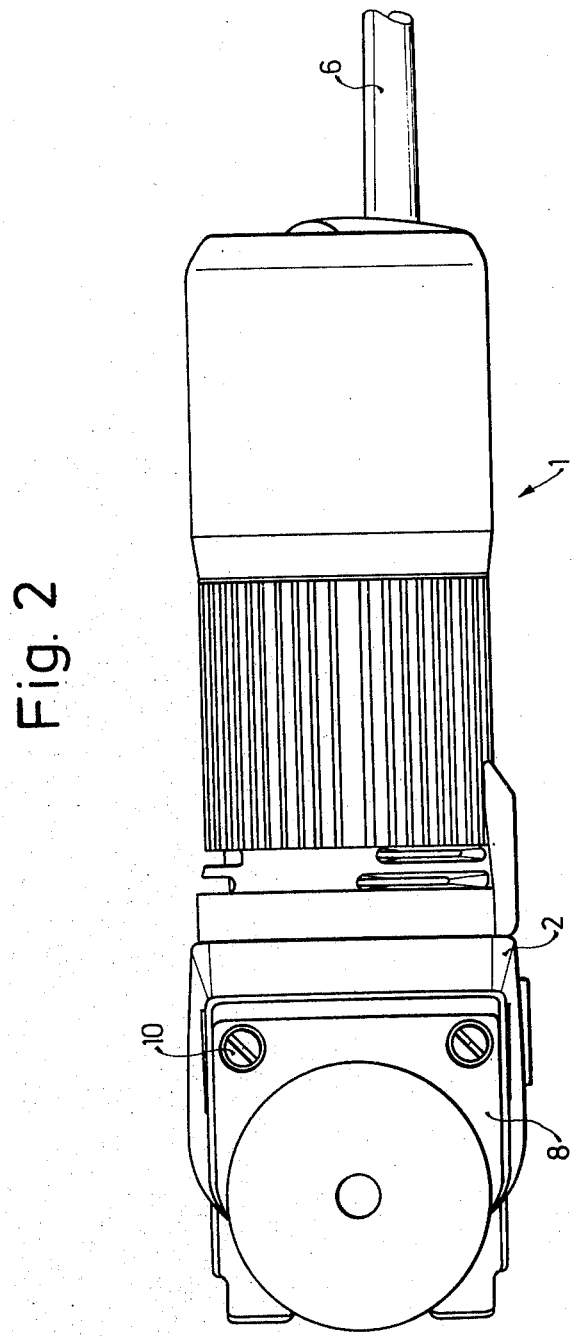
FIG. 2 is a top view of the power tool of FIG. 1.

The present invention relates to power tools in general and, more particularly, to power cutting tools having cutting elements. Referring now to FIGS. 1 and 2, it will be seen that a saber-type or jig saw having a reciprocatory cutting blade has been illustrated in order to facilitate the description of the invention. However, it is to be expressly understood that the present invention is not intended to be specifically limited to jig saws and may encompass other power cutting tools.

Thus, reference numeral 1 generally identifies a hand-held housing which contains a non-illustrated drive system, such as an electric motor, and a non-illustrated gear-type transmission system within housing section 2. The power tool also comprises a foot plate 3, cutting blade 5 which is clamped to reciprocably-movable piston rod 4. which is, in turn, driven by the transmission and drive systems, electrical cable 6 which conducts electricity to the drive motor, and slide switch 7 which actuates the motor.

Motor housing section 1 is preferably cylindrically-shaped into a slim line configuration so that it can be easily held in one hand of a user. Transmission housing section 2 is located forwardly of section 1 and extends upwardly and downwardly thereof, as considered in the vertical direction of FIG. 1.

Figure 3:
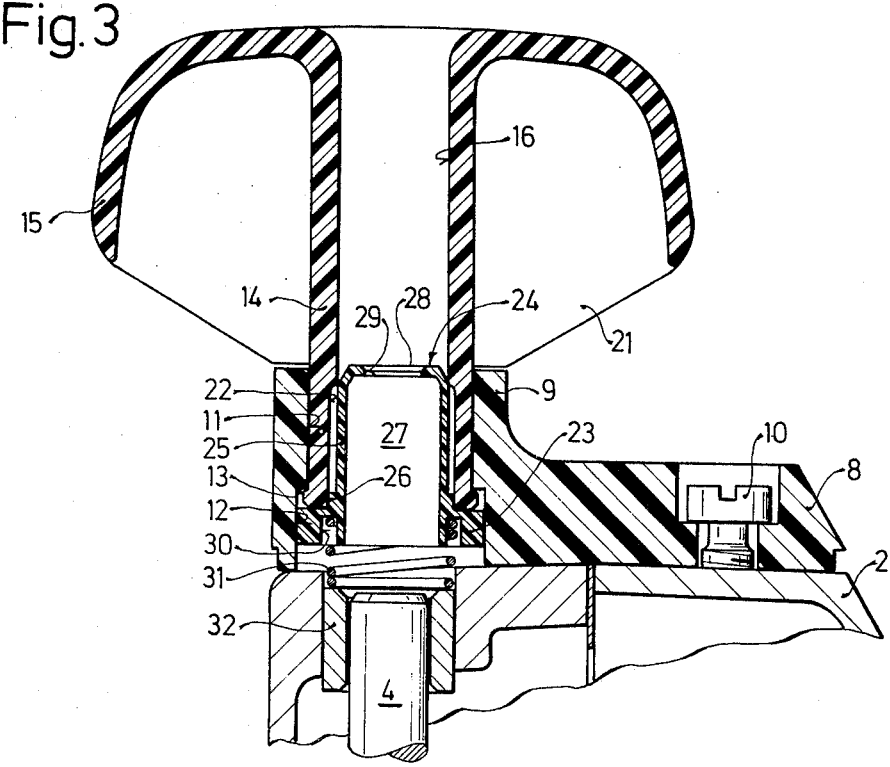
FIG. 3 is a partial view in vertical section of an enlarged detail of FIG. 1.

On the upper portion of the housing above the transmission housing section 2, a flange 8 constituted of heat-insulating synthetic plastic material is mounted. As can be more clearly seen in FIG. 3, flange 8 has a base portion which is detachably mounted to the housing section 2 by means of screws 10 (only one of which is shown).

Integral with the base portion of the flange 8, a cylindrical support portion 9 bounds an elongated bore 11 which is coaxially arranged above the movable rod 4. A guide handle 15 has an upper hand-held head portion, which is generally mushroom- or umbrella-shaped, and a lower elongated shaft portion 14 which is insertable and received within the confines of the bore 11.

As considered in direction of insertion of the handle 15, the bore 11 has a trailing first section having a first diameter and a leading second section 12 having a second diameter which is larger than the first diameter so as to form shoulder 13 intermediate these sections. A collar 18 is provided at the lower region of the shaft portion 14 and extends in direction generally radially outwardly of the latter. The collar 18 is preferably integral with the shaft and head portions so that all parts of the handle 15 are constituted of heat-insulating, resilient, synthetic plastic material. Due to its resilience, the collar 18 will engage the shoulder 13 with a snap-type action when the handle 15 is fully inserted into the bore 11.

Figure 4:
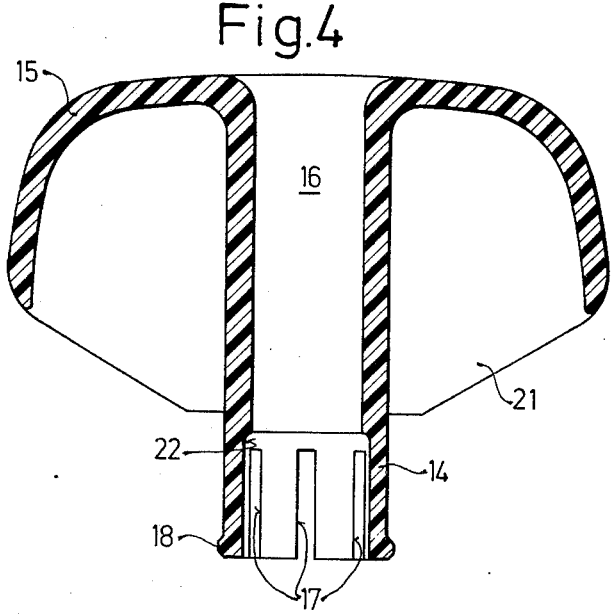
FIG. 4 is a view in vertical section of the guide handle in accordance with the present invention.
Figure 5:
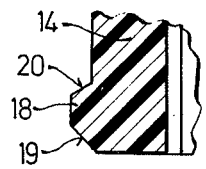
FIG. 5 is an enlarged partial view of a detail of FIG. 4.

The handle 15 is further provided with a central passage 16 which passes through the shaft portion 14. In order to increase the resilience of the lower end of the shaft portion, the central passage 16 is widened at enlarged section 22, thus weakening the walls adjacent the collar 18. Moreover, a plurality of slits 17 (see FIG. 4) which is circumferentially spaced about the shaft portion 14, are formed in enlarged section 22 and extend generally in direction of the elongation of the shaft portion 14.

The hand-held head portion of the handle 15 can be reinforced by positioning a plurality of ribs 21 intermediate the head portion and the shaft portion 14. For example, twelve tapered ribs can be circumferentially spaced about the shaft portion 14.

Mounting means, such as locking bolt 24, is provided at the lower end region of the shaft portion 14 in order to mount the handle 15 on the housing. The bolt 24 comprises a tubular part 25 which is insertable and coaxially received within passage 16, an enlarged annular part 26 radially adjacent the collar 18, and a flange part 23 which overlies the lower end face of the shaft portion 14 and which is received within enlarged section 12 of bore 11. The bolt 24 is turnably mounted in passage 16. The enlarged part 26, which is intermediate the tubular part 25 and flange part 23, has an outer diameter which corresponds to the inner diameter of the enlarged passage section 22.

The tubular part 25 has its upper end 28 beveled so as to ease insertion, and is further formed with an access opening 29 communicating with the passage 16. At the lower end of the tubular part 25, the tubular part is hollowed to form interior space 27 which is coaxially arranged above the movable piston rod 4 and which has a cross-section slightly larger than that of the rod 4 so as to permit entry of the latter therein during cutting.

The flange part 23 has at its underside an annular groove 30 surrounding the space 27. Biasing means 31, preferably a cylindrical wire block spring, has its lower end connected with a stationary bushing 32 mounted on housing section 2, and its upper end received within the groove 30. The spring 31 is operative for urging the bolt 24 into abutment against the handle 15 and, more particularly, for positioning the enlarged part 26 radially interiorly of the collar 18 so as to prevent the resilient collar for flexing inwardly.

Thus, the shaft portion 14 is mounted for turning movement relative to the bore 11 in either circumferential direction thereof. This is particularly desirable since, during cutting, a user having one hand placed on the housing 1 and the other hand placed on the head portion of handle 15 can turn the housing relative to the handle so as to position the cutting blade 5 in any of a plurality of different cutting positions. By pivoting the housing in this manner, a user, who preferably is exerting downward pressure on the handle 15 so as to maintain the power tool in a desired cutting position, can thus guide the power tool to cut any predetermined path comprised of any complex geometrical shape or arbitrary curvilinear pattern.

The power tool can not only be guided by the handle 15 but can also be supported by the latter. In addition, since the handle 15 and the flange 8 are both constituted of heat-insulating synthetic plastic material, then heat energy generated by the drive, transmission and operation of the cutting element will not be transmitted towards the hand of a user who is holding the handle 15.

In order to de-mount the handle 15 from the housing, a tool, such as a screwdriver, pencil or analogous member, is inserted through the access upper opening of the passage 16. The tool is directed so that it abuts against and pushes the bolt 24 downwardly until the enlarged part 26 is moved away from its illustrated position in which it is surrounded by the collar 18. Without the direct physical support of the enlarged part 26, the collar is now free to move radially inwardly when the handle is axially withdrawn from the bore 11. The collar 18 is formed with an engaging surface, such as tapered inclined face 20, which faces a corresponding annular planar engaging surface at the shoulder 13. Upon withdrawal of the handle 15, the tapered face 20 causes the collar 18 to move radially inwardly.

Similarly, in order to aid the mounting of the handle to the housing, the collar 18 is provided with a lowered tapered face 19 which also causes the collar 18 to move radially inwardly during the travel of the collar 18 through the trailing section of the bore 11. After the collar 18 is moved past the shoulder 13, the resilient collar snaps back into its unstressed position behind the shoulder 13. At this point the spring 31 also snaps the enlarged part 26 into position within the enlarged passage section 22 directly behind the collar 18, thereby preventing the collar from moving radially inwardly and also eliminating undesired and unauthorized withdrawal of the handle.

It will be understood that the engaging surface 20 of collar 18 need not be tapered and could be configurated as an annular planar surface. In that case the shoulder 13 would be configurated not as an annular planar surface, but as a tapered surface.

In operation of the power tool, it is essential that the hand which holds down and guides the power tool form a lever arm which is as short as possible and whose turning point is about the elongation of the cutting blade in order to prevent the blade from flexing and breaking. Since the interior space 27 is located directly above the reciprocating piston rod 4, the latter can repeatedly move into and out of the space 27 without interference. If the opening 29 is formed with a diameter larger than the rod 4, then the stroke of the rod can be made still longer. Thereby, the height of the power tool intermediate its upper and lower portions can be made very small, a feature which is especially attractive in reducing the cost of manufacture.

It will be understood that each of the elements described above, or two or more together, may also find a useful application in other types of constructions differing from the types described above.

While the invention has been illustrated and described as embodied in a guide handle for power tools, it is not intended to be limited to the details shown, since various modifications and structural changes may be made without departing in any way from the spirit of the present invention.

Without further analysis, the foregoing will so fully reveal the gist of the present invention that other can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a power tool, particularly a cutting tool, a combination comprising an elongated cutting element reciprocable in direction of its longitudinal axis; a housing having an upper, a lower and an end portion formed with an elongated bore which extends along said axis downwardly from said upper portion towards said lower portion, said housing also having a hand-held portion for turning said housing about said longitudinal axis; a guide handle having a hand-held head portion mounted at said upper portion of said housing, and an elongated shaft portion received in and mounted for turning movement relative to said bore in either circumferential direction of said axis; and means for mounting said cutting element on said housing so that said cutting element participates in the turning movement of said housing about said longitudinal axis, to thereby position said cutting element in a plurality of different cutting positions during cutting by turning said housing about said axis to different angular positions relative to said shaft portion of said guide handle.

2. A combination as defined in claim 1, wherein said shaft and head portions are integral with each other and are constituted of heat-insulating material.

3. A combination as defined in claim 1, wherein said housing comprises a main body and a flange constituted of heat-insulating material and being mounted on said main body, said flange having means for supporting said guide handle by surrounding a part of the length of said shaft portion, and also bounding said elongated bore.

4. A combination as defined in claim 1, wherein said elongated bore comprises a first section having a first diameter and a second section having a second diameter which is larger than said first diameter so as to form a shoulder intermediate said sections; and further comprising a collar provided at a lower region of said shaft portion and extending in direction generally radially outwardly of the latter, said collar being constituted of resilient material so as to engage said shoulder with snaptype action when said guide handle is inserted into said bore.

5. A combination as defined in claim 1; and further comprising a plurality of resilience-imparting slits circumferentially spaced about a lower region of said shaft portion and extending generally in direction of the elongation thereof.

6. A combination as defined in claim 1, wherein said guide handle further comprises a central passage; and further comprising means for mounting said handle on said housing, said mounting means comprising a tubular part coaxially received in said passage, an annular part radially adjacent a lower region of said shaft portion, and a flange part overlying said lower region of said shaft portion.

7. A combination as defined in claim 1, wherein said housing comprises a main body and a flange constituted of heat-insulating material, said flange having means for detachably mounting the flange to said main body.

8. In a power tool, particularly a cutting tool having a cutting element, a combination comprising a hand-held housing having an upper and a lower portion and an end portion formed with an elongated bore which extends downwardly from said upper portion towards said lower portion, said elongated bore including a first section having a first diameter and a second section having a second diameter which is larger than said first diameter so as to form a shoulder intermediate said sections; a cutting element mounted at a lower region of said end portion of said housing; and a guide handle having a hand-held head portion mounted at said upper portion, an elongated shaft portion, and a collar provided at a lower region of said shaft portion and extending in direction generally radially outwardly of the latter, said collar being constituted of resilient material so as to engage said shoulder with snap-type action when said guide handle is inserted into said bore, said shaft portion and said collar being received in and mounted for turning movement relative to said bore in either circumferential direction thereof so as to permit relative angular movement between said housing and said handle during cutting for positioning the cutting element in a plurality of different cutting positions.

9. A combination as defined in claim 8, wherein said collar and said shoulder respectively have engaging surfaces facing each other, and wherein at least one of said engaging surfaces is tapered.

10. In a power tool, particularly a cutting tool having a cutting element, a combination comprising a hand-held housing having an upper and a lower portion and an end portion formed with an elongated bore which extends downwardly from said upper portion towards said lower portion; a cutting element mounted at a lower region of said end portion of said housing; a guide handle having a handheld head portion, a central passage, and an elongated shaft portion received in and mounted for turning movement relative to said bore in either circumferential direction thereof so as to permit relative angular movement between said housing and said handle during cutting for positioning the cutting element in a plurality of different cutting positions; and means for mounting said handle on said upper portion of said housing, said mounting means comprising a tubular part coaxially received in said central passage, a flange part overlying a lower region of said shaft portion, and an annular part intermediate said tubular part and said flange part, said annular part being located radially adjacent said lower region of said shaft portion.

11. A combination as defined in claim 10; and further comprising a collar provided at said lower region of said shaft portion, said annular part being located radially inwardly of said collar.

12. A combination as defined in claim 10; and further comprising biasing means for urging said flange part into affirmative engagement with said shaft portion.

13. A combination as defined in claim 10, wherein said central passage has an accessible upper opening through which a tool can be inserted for de-mounting said guide handle from said housing.

14. A combination as defined in claim 10, wherein said tubular part is hollow, and wherein said cutting element is mounted for reciprocating movement directly below said hollow tubular part so as to enter therein without interference during cutting.

* * * * *